(12) United States Patent
Madonna et al.

(10) Patent No.: US 9,379,939 B2
(45) Date of Patent: Jun. 28, 2016

(54) SELF TROUBLESHOOTING HOME ROUTER

(75) Inventors: Alex M. Madonna, Spring Lake Heights, NJ (US); Michael Talbert, Nazareth, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 373 days.

(21) Appl. No.: 13/558,677

(22) Filed: Jul. 26, 2012

(65) Prior Publication Data

US 2014/0029407 A1  Jan. 30, 2014

(51) Int. Cl.
*H04L 12/24* (2006.01)
*H04L 12/26* (2006.01)
*H04L 12/28* (2006.01)

(52) U.S. Cl.
CPC ............ *H04L 41/0672* (2013.01); *H04L 41/18* (2013.01); *H04L 41/22* (2013.01); *H04L 43/0811* (2013.01); *H04L 12/2834* (2013.01)

(58) Field of Classification Search
CPC .. H04L 41/18; H04L 43/0811; H04L 41/0672
See application file for complete search history.

(56) References Cited

U.S. PATENT DOCUMENTS

| | | | |
|---|---|---|---|
| 6,269,350 B1 * | 7/2001 | Shah | 705/410 |
| 8,365,018 B2 * | 1/2013 | McIntosh et al. | 714/23 |
| 2006/0126706 A1 * | 6/2006 | Brand | H04M 11/066 375/222 |
| 2008/0181415 A1 * | 7/2008 | Brey et al. | 380/279 |
| 2011/0099360 A1 * | 4/2011 | Bashir et al. | 713/2 |
| 2011/0149720 A1 * | 6/2011 | Phuah et al. | 370/216 |
| 2011/0197246 A1 * | 8/2011 | Stancato et al. | 725/111 |
| 2011/0314051 A1 * | 12/2011 | Cavet et al. | 707/769 |

* cited by examiner

*Primary Examiner* — Alpus H Hsu
*Assistant Examiner* — Anthony Luo (57) ABSTRACT

A device detects DNS timeouts indicative of a connectivity problem, determines, after detection of the DNS timeouts, whether a reboot timer has expired prior to troubleshooting the connectivity problem, and reboots the device and collect error logs when the reboot timer has expired. The device determines whether the rebooting of the device has corrected the connectivity problem, and provides a request to perform a reset of the device when the rebooting of the device fails to correct the connectivity problem. The device receives, based on the request, an instruction to perform the reset of the device, resets the device based on the instruction, and determines whether the resetting of the device has corrected the connectivity problem. The device sends the error logs to the log server when either the rebooting of the resetting of the device corrects the connectivity problem.

19 Claims, 8 Drawing Sheets

SELF TROUBLESHOOTING HOME ROUTER

BACKGROUND

Bundled media services, such as combination packages of television, telephone, and broadband Internet services, have been successfully offered to customer premises with connections to wide area networks (WANs), such as service provider networks. However, customers may experience connectivity problems to the service provider networks. The connectivity problems may be based on many factors, such as, for example, equipment failures, configuration failures, software failures, user error, etc. A home router (also referred to as a residential gateway, a home gateway, etc.) provides an interface from the customer premises (e.g., a local area network (LAN)) to the service provider networks.

Network connectivity provided by the home router to a WAN may fail for a variety of reasons. For example, software failures, hardware failures, etc. associated with the home router may cause a network connectivity failure. Network connectivity failure may be frustrating for users associated with the customer premises.

DETAILED DESCRIPTION OF PREFERRED EMBODIMENTS

The following detailed description refers to the accompanying drawings. The same reference numbers in different drawings may identify the same or similar elements.

A home router may attempt to detect connectivity problems by providing, in the home router, a continuously executing process that monitors connectivity to the service provider networks as well as connectivity to user devices present in the customer premises. However, the home router lacks sufficient processor and memory capabilities to support a continuously executing process that monitors connectivity to the service provider networks and/or the user devices. Thus, the continuously executing process causes performance issues for the home router with respect to routing traffic to and/or from the service provider networks and/or the user devices present in the customer premises.

Systems and/or methods described herein may provide a home router that proactively monitors and troubleshoots connectivity problems associated with service provider networks (e.g., WANs) and/or user devices of a customer premises network (e.g., a LAN). The home router may begin to troubleshoot the connectivity problems based on detection of one or more trigger conditions. The trigger conditions may be detectable by the home router using relatively little computing resources of the home router, which may help to prevent performance degradation of the home router. The proactive monitoring and troubleshooting by the home router may prevent customers from utilizing customer service centers (e.g., provided by the service provider) when the connectivity problems arise. This may reduce customer call volume to the customer service centers and may provide better customer end-to-end service.

Figure 1:
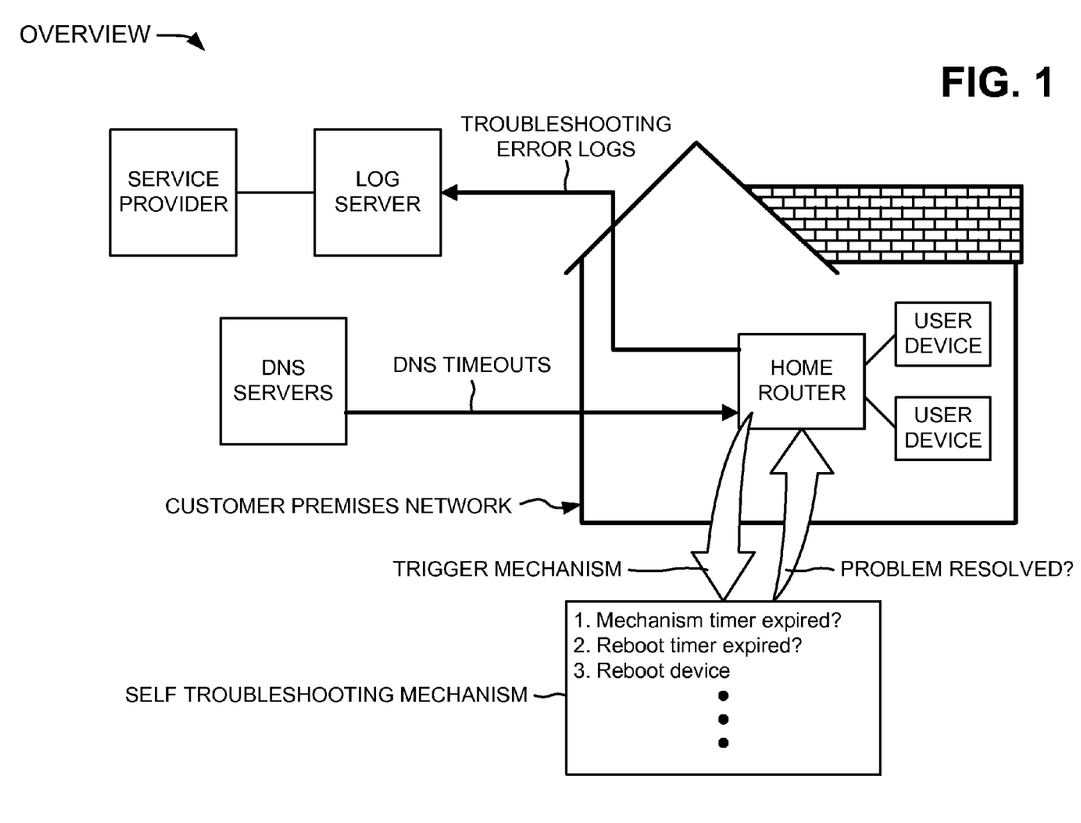
FIG. 1 is a diagram of an overview of an example implementation described herein.

FIG. 1 is a diagram of an overview of an example implementation described herein. As shown, a customer premises network may be connected to a domain name system (DNS) server, a log server, and a service provider. The customer premises network may include a home router connected with user devices. The DNS server, the log server, and the service provider may be associated with a WAN that provides Internet services, and potentially other services, to the customer premises network.

The customer premises network may include one or more devices connected to each other to form a LAN. The devices in the customer premises network may include, for example, set-top boxes (STBs), televisions, computers, and home networking equipment (e.g., home routers, cables, splitters, local gateways, etc.). The home router may include a device that provides connectivity between equipment within the customer premises network (e.g., the user devices) and between the customer premises equipment and an external network (e.g., the WAN associated with the DNS server, the log server, and the service provider). The user devices may include televisions, telephones, desktop computers, or other types of computation and communication devices.

The DNS server may include one or more computation and communication devices that host a network service for providing responses to queries against a directory of Internet protocol (IP) addresses and domain names. The DNS server translates domain names and hostnames into the corresponding numeric IP addresses. The log server may include one or more computation and communication devices that store error logs associated with customer premises networks. The service provider may include one or more computation and communication devices that provide Internet, television, and/or television content and/or services to devices in the customer premises network.

As further shown in FIG. 1, the home router may utilize DNS services as a trigger to troubleshoot connectivity problems. The DNS services may be consistently executing and present at the home router under normal operating conditions. However, a connection failure between the DNS server and the home router may cause DNS failures or timeouts at the home router. The DNS timeouts may be indicative of a connectivity problem (e.g., a WAN failure), and may cause the home router to trigger a self troubleshooting mechanism. The self troubleshooting mechanism may cause the home router to perform a variety of operations in order to resolve the connectivity problem. For example, the self troubleshooting mechanism may reboot the home router, reset the home router to default settings, etc. in an attempt to resolve the connectivity problem.

The self troubleshooting mechanism may collect troubleshooting error logs from the home router while attempting to resolve the connectivity problem. The self troubleshooting mechanism may or may not resolve the problem, and may provide the troubleshooting error logs to the log server. If the self troubleshooting mechanism resolves the connectivity problem, the home router may continue to operate as normal. If the self troubleshooting mechanism fails to resolve the connectivity problem, the log server may share the troubleshooting error logs with the service provider so that the service provider may determine and/or resolve the connectivity problem.

As used herein, the terms "customer" and "user" are intended to be broadly interpreted to include a user device or a home router, or a user of a user device or a home router.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
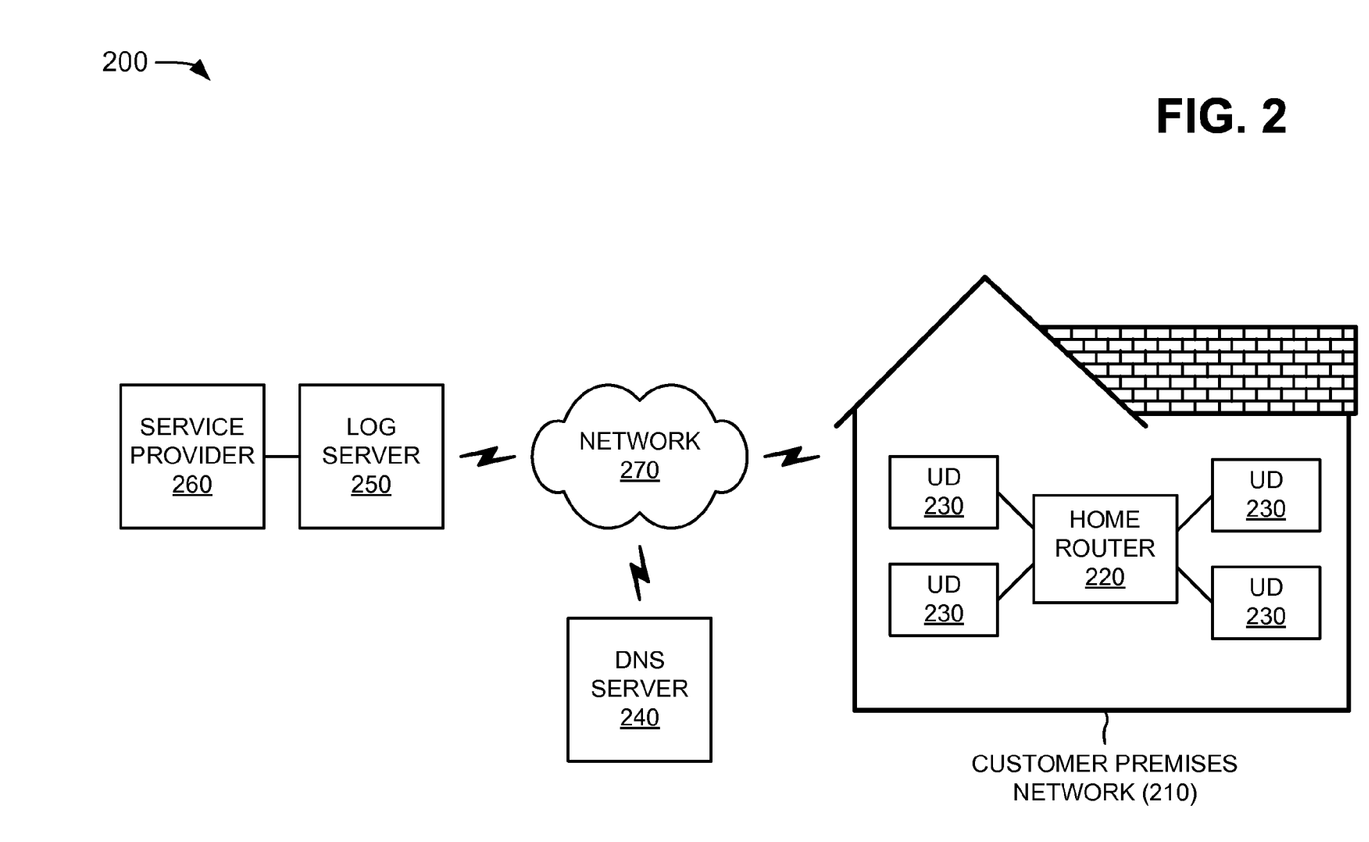
FIG. 2 is a diagram of an example environment in which systems and/or methods described herein may be implemented.

FIG. 2 is a diagram of an example environment 200 in which systems and/or methods described herein may be implemented. As illustrated, environment 200 may include a customer premises network 210 (e.g., that includes a home router 220 connected to user devices (UDs) 230), a DNS server 240, a log server 250, and a service provider 260 connected by a network 270. Devices and/or networks of environment 200 may connect via wired and/or wireless connections. One customer premises network 210, one home router 220, four user device 230, one DNS server 240, one log server 250, one service provider 260, and one network 270 have been illustrated in FIG. 2 for simplicity. In practice, there may be more customer premises networks 210, home routers 220, user devices 230, DNS servers 240, log servers 250, service providers 260, and/or networks 270.

Customer premises network 210 may include one or more devices connected to each other. The devices in customer premises network 210 may include, for example, STBs, televisions, computers, and home networking equipment (e.g., home routers, cables, splitters, local gateways, etc.). The devices within customer premises network 210 may be connected via wired (e.g., coaxial cable, Telecommunications Industry Association category 5 ("cat 5") cable, etc.) or wireless connections (e.g., using network devices such as those available under the IEEE 802.11 wireless LAN standards) to form a LAN. In the example shown in FIG. 2, customer premises network 210 may include home router 220 connected to user devices 230.

Home router 220 may include a multi-function networking device that may combine the functions of a Digital Subscriber Line (DSL) or cable modem, a firewall, a router, a network switch, and/or a wireless access point into a single device. Home router 220 may provide connectivity between equipment within customer premises network 210 (e.g., user devices 230) and between the customer premises equipment and an external network (e.g., network 270). In one implementation, home router 220 may employ one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). Alternatively, or additionally, different short-range wireless protocols and/or frequencies may be used by home router 220. Home router 220 may also include one or more wired (e.g., Ethernet) connections.

User device 230 may include any device that is capable of communicating with network 270 via home router 220. For example, user device 270 may include a mobile computation and communication device, such as a laptop computer; a radiotelephone; a personal communications system (PCS) terminal (e.g., that may combine a cellular radiotelephone with data processing and data communications capabilities); a personal digital assistant (PDA) (e.g., that can include a radiotelephone, a pager, Internet/intranet access, etc.); a tablet computer; a smart phone; a global positioning system (GPS) device; a content recording device (e.g., a camera, a video camera, etc.); etc. Alternatively, or additionally, user device 230 may include a fixed (e.g., provided in a particular location, such as within a customer's home) computation and communication device, such as a television, a STB, a digital video recorder (DVR), a laptop computer, a personal computer, a gaming system, etc.

DNS server 240 may include one or more server devices, or other types of computation and communication devices, that gather, process, search, and/or provide information in a manner described herein. In one example, DNS server 240 may provide a hierarchical distributed naming system for computers, services, or any resource connected to the Internet or a private network. DNS server 240 may associate various information with domain names assigned to each of the participating entities. DNS server 240 may resolve queries for the domain names into IP addresses for the purpose of locating computer services and devices worldwide. In one implementation, DNS server 240 may include a primary DNS server and a secondary DNS server that communicate with home router 220. Failed connectivity between home router 220 and the primary and secondary DNS servers may cause DNS timeouts at home router 220 and may be indicative of a WAN failure. For example, DNS requests, made by home router 220 on behalf of user devices 230, may timeout and fail, which may be indicative of a WAN failure. Alternatively or additionally, a network connection, such as a socket connection, between home router 220 and DNS server 240, may timeout and fail, which may also be indicative of a WAN failure.

Log server 250 may include one or more server devices, or other types of computation and communication devices, that gather, process, search, and/or provide information in a manner described herein. In one implementation, log server 250 may store troubleshooting error logs generated by home router 220, and may provide the troubleshooting error logs to service provider 260. The troubleshooting error logs may include one or more error codes generated by home router 220 when home router 220 experiences connectivity problems with user devices 230, network 270, etc. Service provider 260 may utilize the troubleshooting error logs to determine and/or resolve the connectivity problems.

Service provider 260 may include one or more server devices, or other types of computation and communication devices, that gather, process, search, and/or provide information in a manner described herein. In one implementation, service provider 260 may include a web server, a computer system, an application, a cable head-end, and/or a broadcasting device capable of providing IP-based content and/or services to devices in customer premises network 210. In one example, service provider 260 may utilize a remote control protocol (e.g., the Technical Report 069 (TR-069) protocol, the Simple Network Management Protocol (SNMP), etc.) to control timers associated with a self troubleshooting mechanism provided by home router 220.

Network 270 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks. In one example implementation, network 270 may include a network that interconnects customer premises network 210 with DNS server 240, log server 250, and/or service provider 260.

Although FIG. 2 shows example devices/networks of environment 200, in other implementations, environment 200 may include fewer devices/networks, different devices/networks, differently arranged devices/networks, or additional devices/networks than depicted in FIG. 2. Alternatively, or additionally, one or more devices/networks of environment 200 may perform one or more other tasks described as being performed by one or more other devices/networks of environment 200.

Figure 3:
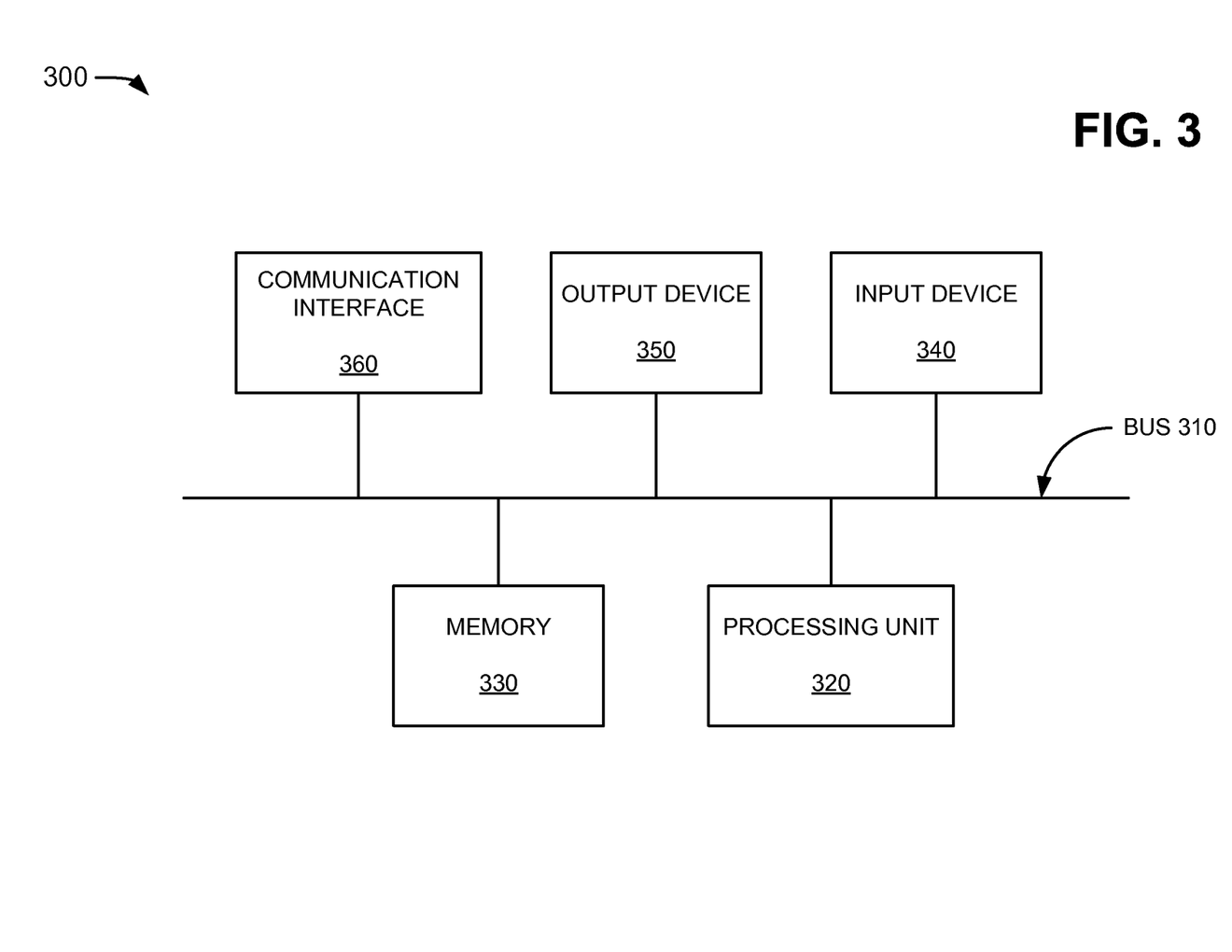
FIG. 3 is a diagram of example components of a device that may correspond to one of the devices of the environment depicted in FIG. 2.

FIG. 3 is a diagram of example components of a device 300 that may correspond to one or more devices of environment 200 (FIG. 2). In one example implementation, one or more of the devices of environment 200 may include one or more devices 300 or one or more components of device 300. As illustrated in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more ASICs, FPGAs, or the like.

Memory 330 may include a RAM or another type of dynamic storage device that stores information and instructions for execution by processing unit 320, a ROM or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a touch screen display, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of environment 300.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
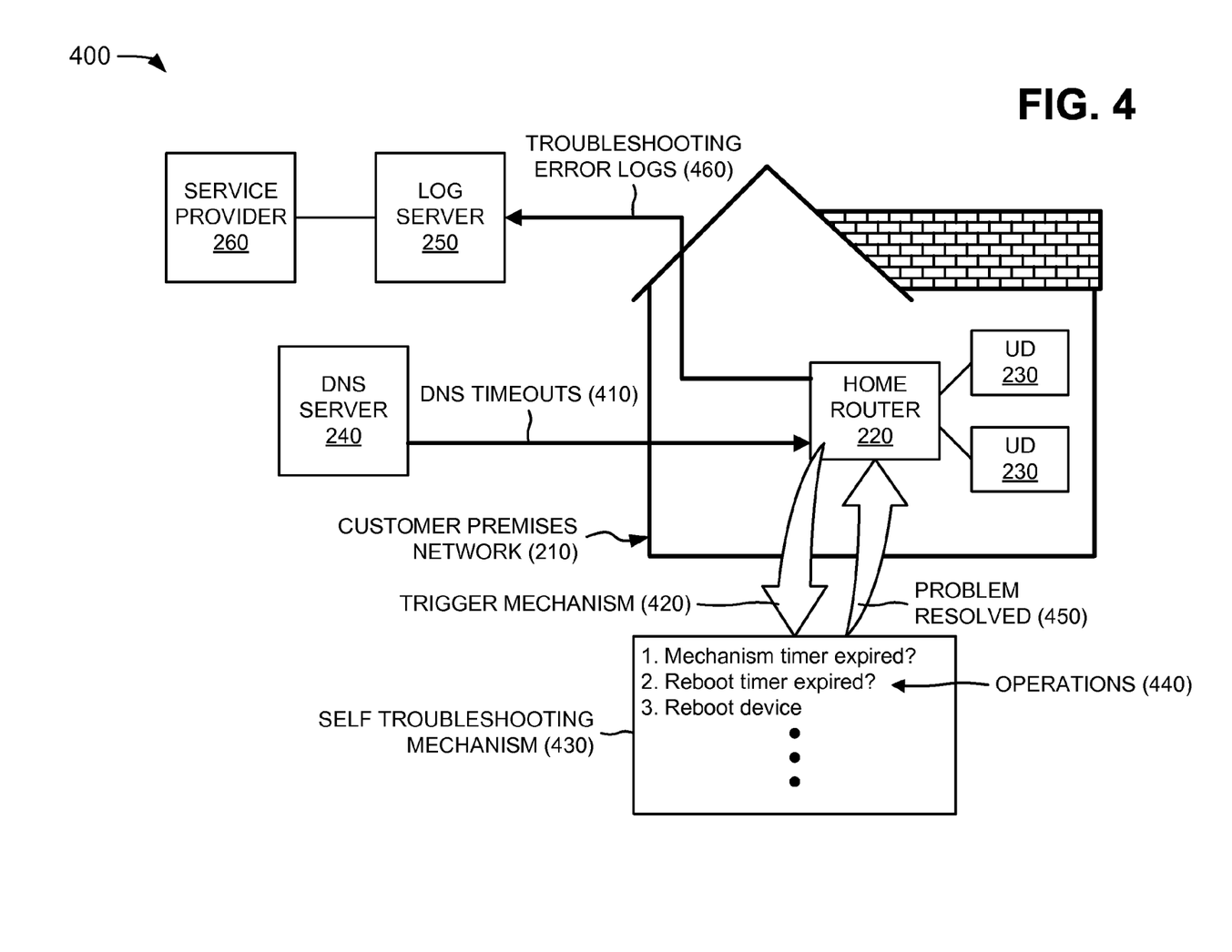
FIG. 4 is a diagram of example operations capable of being performed by an example portion of the environment in FIG. 2.

FIG. 4 is a diagram of example operations capable of being performed by an example portion 400 of environment 200 (FIG. 2). As shown, environment portion 400 may include customer premises network 210, home router 220, user devices 230, DNS server 240, log server 250, and service provider 260. Customer premises network 210, home router 220, user devices 230, DNS server 240, log server 250, and service provider 260 may include the features described above in connection with, for example, one or more of FIGS. 1-3.

With reference to FIG. 4, home router 220 may utilize DNS services (e.g., provided by DNS server 240) as a trigger to troubleshoot connectivity problems. The DNS services may be consistently executing and present at home router 220 under normal operating conditions. However, a connection failure between DNS server 240 and home router 220 may cause detection of DNS failures or timeouts 410 at home router 220. DNS timeouts 410 may occur when DNS server 240 fails respond quickly enough, or at all, to a domain name query provided by home router 220. DNS timeouts 410 may be indicative of a connectivity problem (e.g., a WAN failure), and may cause home router 220 to trigger 420 a self troubleshooting mechanism 430. In one example, DNS server 240 may include a primary DNS server and a secondary DNS server. Home router 220 may trigger 420 self troubleshooting mechanism 430 when a particular number (e.g., three, four, etc.) of DNS timeouts 410 occur between home router 220 and the primary DNS server, and another particular number (e.g., three, four, etc.) of DNS timeouts 410 occur between router 220 and the secondary DNS server. In one implementation, service provider 260 may communicate with and configure the particular number of DNS timeouts 410 and/or the other particular number of DNS timeouts 410 required to trigger 420 self troubleshooting mechanism 430.

In one example implementation, other DNS errors that may provide an indication of a connectivity problem (e.g., a WAN failure) may be utilized instead of DNS timeouts 410. Home router 220 may determine whether DNS timeouts 410 (or other DNS errors) are occurring while using relatively little computing resources of home router 220. Home router 220 may generate trigger 420 when a certain number of DNS timeouts 410 (or other DNS errors) are detected. Such DNS error detection may be provided within routines of home router 220, and modifying the routines to include trigger 420 (e.g., to take corrective action) may not add additional overhead to the normal processing of home router 220.

Home router 220 may include one or more checks to prevent self troubleshooting mechanism 430 from unnecessarily executing and degrading the performance of home router 220. In one example, home router 220 may include a mechanism timer that must expire before self troubleshooting mechanism 430 may execute again. The mechanism timer may be configured by service provider 260, and may include a particular number of hours (e.g., six, twelve, twenty-four, etc. hours) that must expire before self troubleshooting mechanism 430 may execute again. Alternatively, or additionally, home router 220 may include a reboot timer that must expire before self troubleshooting mechanism 430 may cause home router 220 to reboot again. The reboot timer may be configured by service provider 260, and may include a particular number of hours (e.g., twelve, twenty-four, etc. hours) that must expire before self troubleshooting mechanism 430 may cause home router 220 to reboot again. If either the mechanism timer or the reboot timer has not expired, home router 220 may do nothing and may not execute self troubleshooting mechanism 430.

After expiration of the mechanism timer and/or the reboot timer, self troubleshooting mechanism 430 may cause home router 220 to perform a variety of operations 440 in order to resolve the connectivity problem. For example, self troubleshooting mechanism 430 may cause home router 220 to reboot and collect troubleshooting error logs associated with home router 220 and/or the connectivity problem. If rebooting corrects the connectivity problem and/or no further DNS timeouts 410 occur, home router 220 may determine that the connectivity problem is resolved, as indicated by reference number 450. Home router 220 may provide troubleshooting error logs 460 to log server 250. Troubleshooting error logs 460 may include one or more error codes generated by home router 220 when home router 220 experiences connectivity problems with user devices 230, network 270, etc. Service provider 260 may utilize troubleshooting error logs 460 to determine and/or resolve the connectivity problems.

If rebooting does not correct the connectivity problem, self troubleshooting mechanism 430 may cause home router 220 to provide for display (e.g., to a user via one or more user devices 230) information indicating that the rebooting did not correct the connectivity problem. The information may also request whether or not the user wishes to continue to troubleshoot the connectivity problem. If the user does not wish to continue to troubleshoot the connectivity problem, the user may provide a first indication (e.g., via one of more user devices 230) indicating that the user does not wish to continue to troubleshoot the connectivity problem. Based on the first indication, self troubleshooting mechanism 430 may cause home router 220 to provide for display, to the user, an error code associated with the connectivity problem, a customer service center telephone number, and instructions to call the customer service center.

If the user wishes to continue to troubleshoot the connectivity problem, the user may provide a second indication (e.g., via one or more user devices 230) indicating that the user wishes to continue to troubleshoot the connectivity problem. Based on the second indication, self troubleshooting mechanism 430 may cause home router 220 to provide for display (e.g., via one or more user devices 230) information requesting whether or not the user wishes to perform a factory reset of home router 220.

If the user does not wish to perform a factory reset of home router 220, the user may provide a third indication (e.g., via one of more user devices 230) indicating that the user does not wish to perform a factory reset of home router 220. Based on the third indication, self troubleshooting mechanism 430 may cause home router 220 to provide for display, to the user, an error code associated with the connectivity problem, a customer service center telephone number, and instructions to call the customer service center.

If the user wishes to perform a factory reset of home router 220, the user may provide a fourth indication (e.g., via one or more user devices 230) indicating that the user wishes to perform a factory reset of home router 220. Based on the fourth indication, self troubleshooting mechanism 430 may cause home router 220 to perform a factory reset. The factory reset may cause home router 220 to be reset to factory default settings originally provided for home router 220.

If factory reset corrects the connectivity problem and/or no further DNS timeouts 410 occur, home router 220 may determine that the connectivity problem is resolved, as indicated by reference number 450. Home router 220 may provide troubleshooting error logs 460 to log server 250. If the factory reset does not correct the connectivity problem, self troubleshooting mechanism 430 may cause home router 220 to provide for display, to the user, an error code associated with the connectivity problem, a customer service center telephone number, and instructions to call the customer service center.

In one example implementation, if self troubleshooting mechanism 430 resolves the connectivity problem, home router 220 may continue to operate as normal. If self troubleshooting mechanism 430 fails to resolve the connectivity problem, log server 250 may share troubleshooting error logs 460 with service provider 260 so that service provider 260 may determine and/or resolve the connectivity problem. Alternatively, or additionally, service provider 260 may have access to troubleshooting error logs 460 regardless of whether the connectivity problem is resolved.

Although FIG. 4 shows example components of environment portion 400, in other implementations, environment portion 400 may include fewer components, different components, differently arranged components, or additional components than depicted in FIG. 4. Additionally, or alternatively, one or more components of environment portion 400 may perform one or more other tasks described as being performed by one or more other components of environment portion 400.

Figure 5:
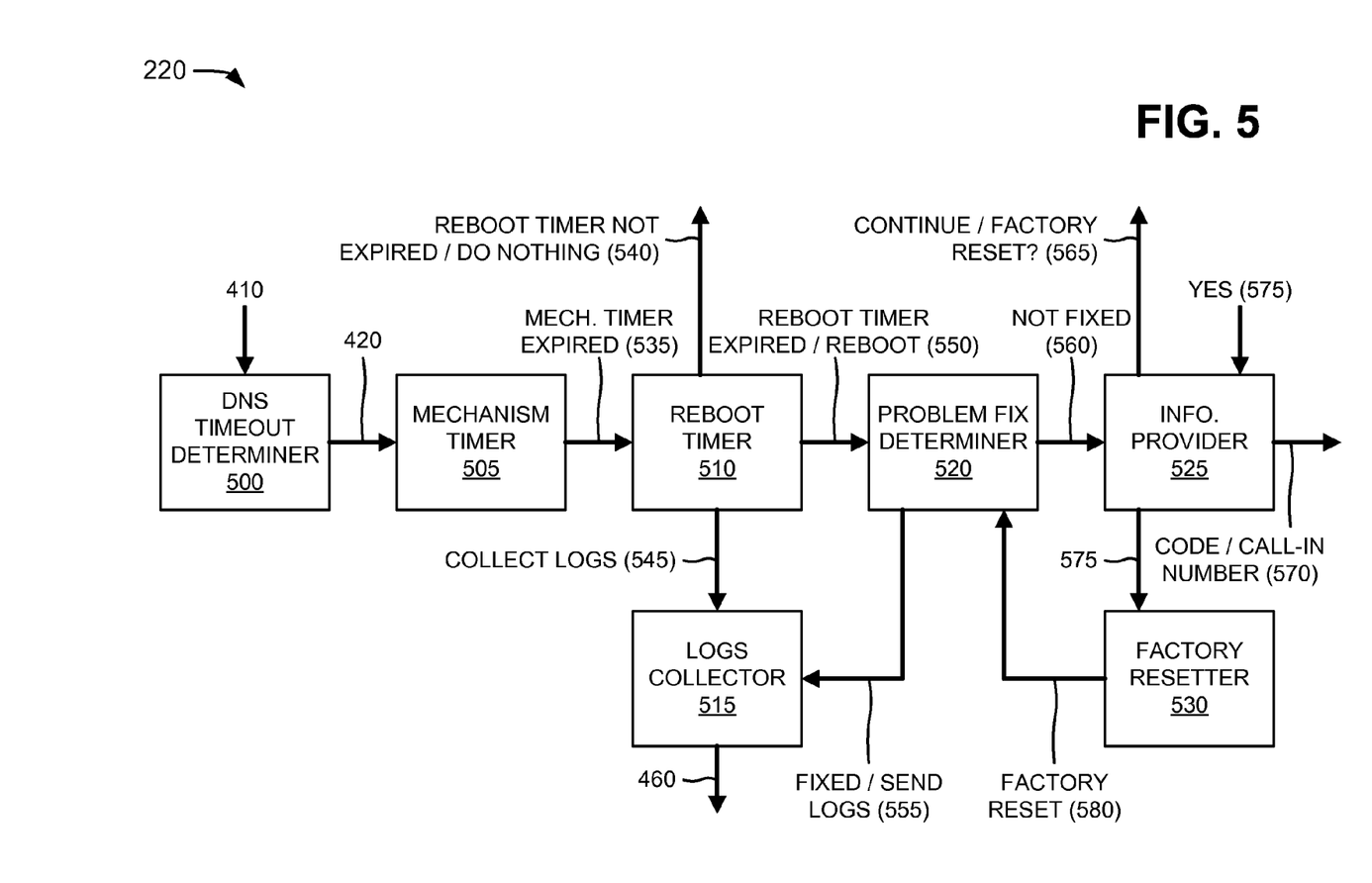
FIG. 5 is a diagram of example functional components of a home router of FIG. 2.

FIG. 5 is a diagram of example functional components of home router 220. In one implementation, the functions described in connection with FIG. 5 may be performed by one or more components of device 300 (FIG. 3) or by one or more devices 300. As shown in FIG. 5, home router 220 may include a DNS timeout determiner 500, a mechanism timer 505, a reboot timer 510, a logs collector 515, a problem fix determiner 520, an information provider 525, and a factory resetter 530.

DNS timeout determiner 500 may receive DNS timeouts 410, which may be indicative of a connectivity problem (e.g., a WAN failure). Based on the detection of DNS timeouts 410, DNS timeout determiner 500 may trigger 420 mechanism timer 505. In one example, DNS timeout determiner 500 may trigger 420 mechanism timer 505 when a particular number (e.g., three, four, etc.) of DNS timeouts 410 occur between home router 220 and the primary DNS server, and another particular number (e.g., three, four, etc.) of DNS timeouts 410 occur between router 220 and the secondary DNS server.

Mechanism timer 505 may include a timer that must expire before self troubleshooting mechanism 430 may execute. Mechanism timer 505 may be configured by service provider 260, and may include a particular number of hours (e.g., six, twelve, twenty-four, etc. hours) that must expire before self troubleshooting mechanism 430 may execute. If mechanism timer 505 has not expired, home router 220 may do nothing and may not execute self troubleshooting mechanism 430. If mechanism timer 505 has expired, as indicated by reference number 535, home router 220 may trigger reboot timer 510.

Reboot timer 510 may include a timer that must expire before self troubleshooting mechanism 430 may cause home router 220 to reboot. Reboot timer 510 may be configured by service provider 260, and may include a particular number of hours (e.g., twelve, twenty-four, etc. hours) that must expire before self troubleshooting mechanism 430 may cause home router 220 to reboot. If reboot timer 510 has not expired, home router 220 may do nothing and may not reboot home router 220, as indicated by reference number 540. If reboot timer 510 has expired, home router 220 may collect troubleshooting error logs, as indicated by reference number 545, and may reboot, as indicated by reference number 550.

Logs collector 515 may receive troubleshooting error logs generated during execution of self troubleshooting mechanism 430, and may store the troubleshooting error logs. Logs collector 515 may provide the stored troubleshooting error logs to log server 250 when instructed by home router 220.

Problem fix determiner 520 may determine whether the rebooting of home router 220 corrected the connectivity problem. If rebooting corrects the connectivity problem and/or no further DNS timeouts 410 occur, problem fix determiner 520 may determine that the connectivity problem is resolved and may instruct logs collector 515 to send the collected troubleshooting error logs, as indicated by reference number 555. In response to instruction 555, logs collector 515 may provide troubleshooting error logs 460 to log server 250. If rebooting fails to correct the connectivity problem, problem fix determiner 520 may provide an indication 560, to information provider 525, indicating that the connectivity problem is not resolved.

Information provider 525 may receive indication 560, and may provide for display (e.g., to a user via one or more user devices 230) information 565 requesting whether or not the user wishes to continue to troubleshoot the connectivity problem and/or perform a factory reset of home router 220. If the user does not wish to continue to troubleshoot the connectivity problem or to perform the factory reset, the user may provide an indication (e.g., via one of more user devices 230) indicating that the user does not wish to continue to troubleshoot the connectivity problem or to perform the factory reset. Based on the indication, information provider 525 may provide for display, to the user, an error code associated with the connectivity problem, a customer service center telephone number, and instructions to call the customer service center, as indicated by reference number 570.

If the user wishes to continue to troubleshoot the connectivity problem and to perform the factory reset, the user may provide an indication 575 (e.g., a "Yes" indication via one or more user devices 230) indicating that the user wishes to troubleshoot the connectivity problem and to perform the factory reset. Information provider 525 may provide indication 575 to factory resetter 530.

Based on indication 575, factory resetter 530 may cause home router 220 to perform a factory reset 580 of home router 220. Factory reset 580 may cause home router 220 to be reset to factory default settings originally provided for home router 220. If factory reset 580 corrects the connectivity problem, problem fix determiner 520 may determine that the connectivity problem is resolved and may instruct logs collector 515 to send the collected troubleshooting error logs, as indicated by reference number 555. In response to instruction 555, logs collector 515 may provide troubleshooting error logs 460 to log server 250. If factory reset 580 fails to correct the connectivity problem, problem fix determiner 520 may provide indication 560, to information provider 525, indicating that the connectivity problem is not resolved. Information provider 525 may provide for display, to the user, an error code associated with the connectivity problem, a customer service center telephone number, and instructions to call the customer service center, as indicated by reference number 570.

Although FIG. 5 shows example functional components of home router 220, in other implementations, home router 220 may include fewer functional components, different functional components, differently arranged functional components, or additional functional components than depicted in FIG. 5. Additionally, or alternatively, one or more functional components of home router 220 may perform one or more other tasks described as being performed by one or more other functional components of home router 220.

Figure 6A:
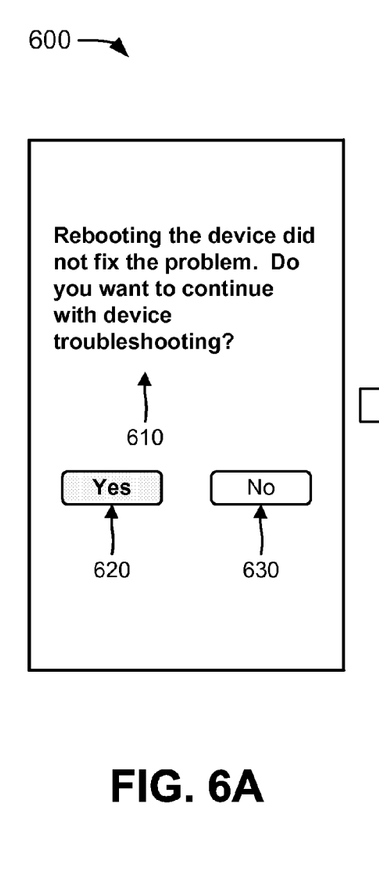
FIGS. 6A-6C are diagrams of an example user interface that may be generated or provided by the home router of FIG. 2.
Figure 6B:
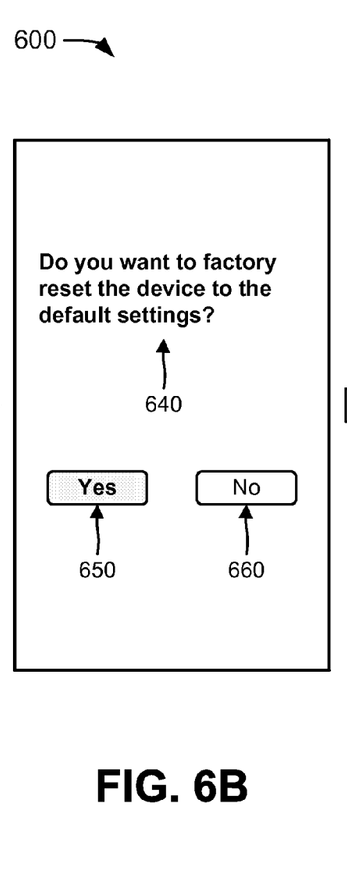
Figure 6C:
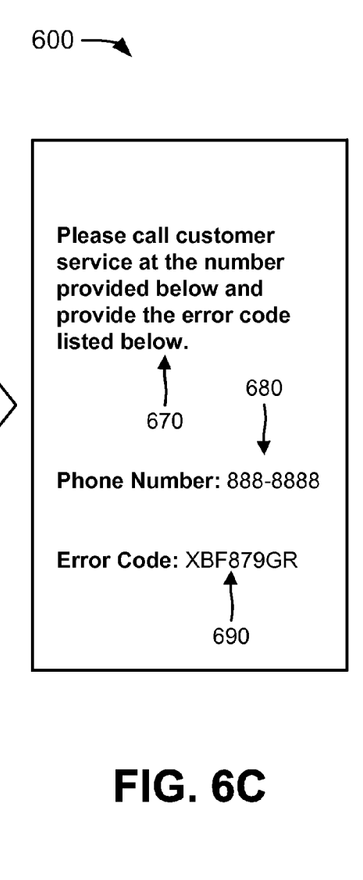

FIGS. 6A-6C are diagrams of an example user interface 600 that may be generated or provided by home router 220 (e.g., via one or more user devices 230). User interface 600 may include a graphical user interface (GUI) or a non-graphical user interface, such as a text-based interface. User interface 600 may provide information to users via a customized interface (e.g., a proprietary interface) and/or other types of interfaces (e.g., a browser-based interface, etc.). User interface 600 may receive user inputs via one or more input devices, may be user-configurable (e.g., a user may change the size of user interface 600, information displayed in user interface 600, a color scheme used by user interface 600, positions of text, images, icons, windows, etc., in user interface 600, etc.), and/or may not be user-configurable. Information associated with user interface 600 may be selected and/or manipulated by a user of user device 230 (e.g., via a touch screen display, a mouse, a keyboard, a keypad, voice commands, etc.).

If rebooting does not correct the connectivity problem, self troubleshooting mechanism 430 may cause home router 220 to provide for display (e.g., to a user via one or more user devices 230) user interface 600 of FIG. 6A. As shown in FIG. 6A, user interface 600 may include information 610 indicating that the rebooting did not correct the connectivity problem. Information 610 may also request whether or not the user wishes to continue to troubleshoot the connectivity problem. User interface 600 of FIG. 6A may include a mechanism 620 (e.g., an icon, a button, a link, etc.) that, when selected by the user, indicates that the user wishes to continue to troubleshoot the connectivity problem. If the user selects mechanism 620, home router 220 may provide for display (e.g., via one or more user devices 230) user interface 600 depicted in FIG. 6B. User interface 600 of FIG. 6A may include a mechanism 630 (e.g., an icon, a button, a link, etc.) that, when selected by the user, indicates that the user does not wish to continue to troubleshoot the connectivity problem. If the user selects mechanism 630, home router 220 may provide for display (e.g., via one or more user devices 230) user interface 600 depicted in FIG. 6C.

As shown in FIG. 6B, user interface 600 may include information 640 requesting whether or not the user wishes to perform a factory reset of home router 220. User interface 600 of FIG. 6B may include a mechanism 650 (e.g., an icon, a button, a link, etc.) that, when selected by the user, indicates that the user wishes to perform a factory reset of home router 220. If the user selects mechanism 650, home router 220 may perform a factory reset. The factory reset may cause home router 220 to be reset to factory default settings originally provided for home router 220. If the factory reset does not correct the connectivity problem, home router 220 may provide for display (e.g., via one or more user devices 230) user interface 600 depicted in FIG. 6C. User interface 600 of FIG. 6B may include a mechanism 660 (e.g., an icon, a button, a link, etc.) that, when selected by the user, indicates that the user does not wish to perform a factory reset. If the user selects mechanism 660, home router 220 may provide for display (e.g., via one or more user devices 230) user interface 600 depicted in FIG. 6C.

User interface 600 of FIG. 6C may include information 670 instructing the user to call a customer service center at a particular telephone number 680. Information 670 may also instruct the user to provide (e.g., to a customer service center representative) an error code 690 associated with the connectivity problem. If factory reset corrects the connectivity problem and/or no further DNS timeouts 410 occur, home router 220 may determine that the connectivity problem is resolved and may not display user interface 600 of FIG. 6C to the user.

Figure 7A:
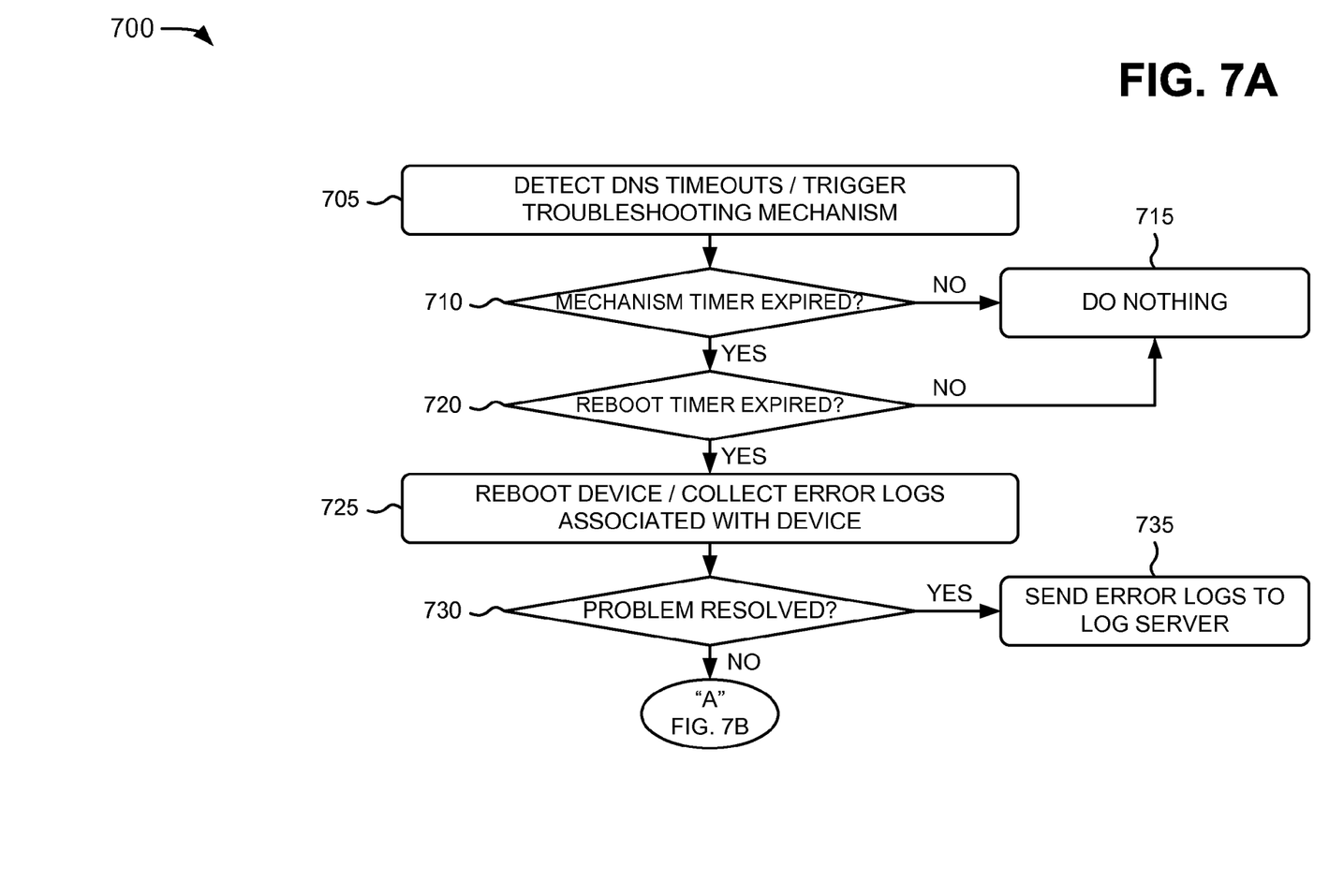
FIGS. 7A and 7B are flow charts of an example process for providing self troubleshooting functionality in a home router according to an implementation described herein.
Figure 7B:
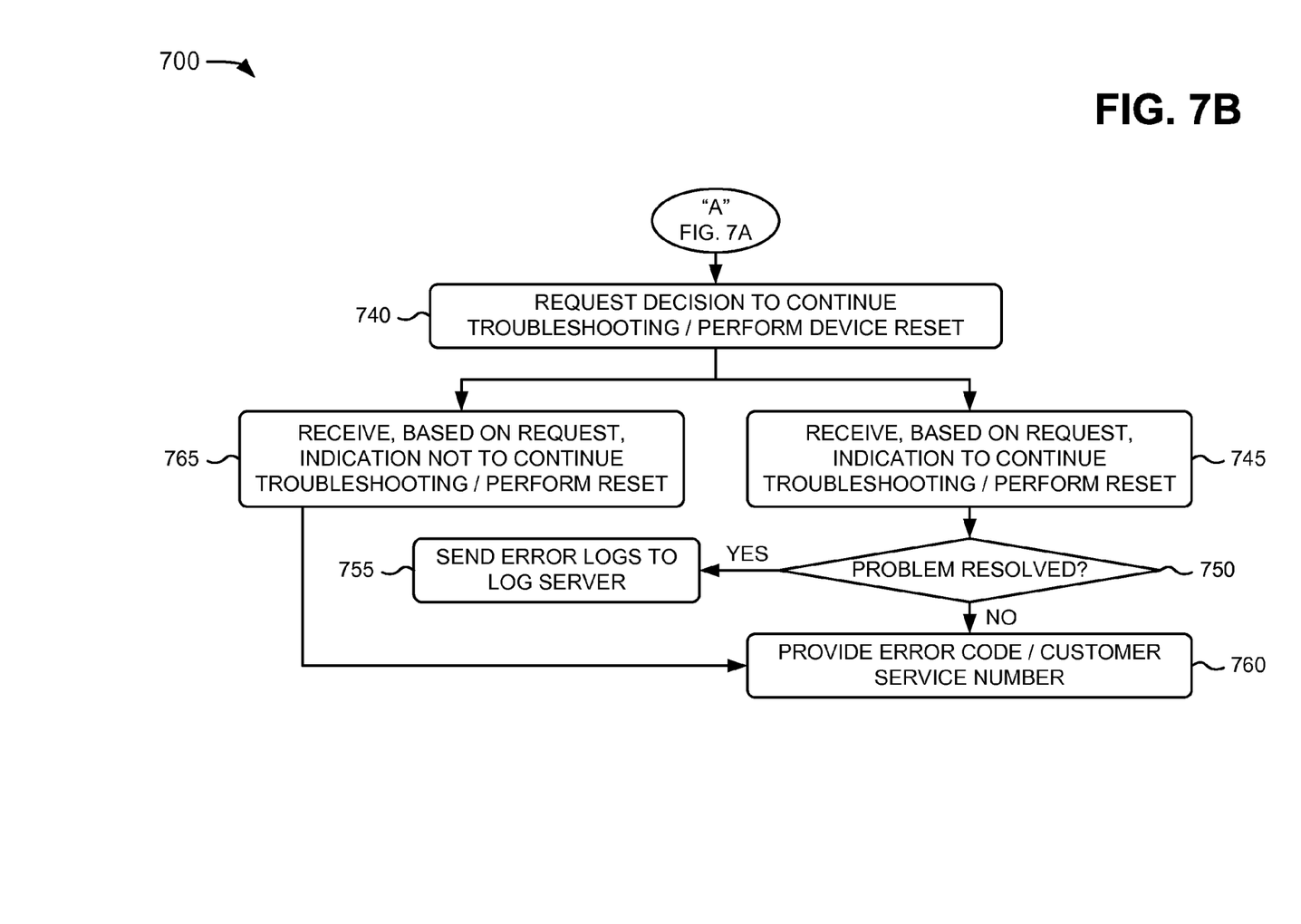

FIGS. 7A and 7B are flow charts of an example process 700 for providing self troubleshooting functionality in a home router according to an implementation described herein. In one implementation, process 700 may be performed by home router 220. Alternatively, or additionally, some or all of process 700 may be performed by another device or group of devices, including or excluding home router 220.

As shown in FIG. 7A, process 700 may include detecting DNS timeouts and triggering a troubleshooting mechanism based on the detected DNS timeouts (block 705). For example, in an implementation described above in connection with FIG. 4, home router 220 may utilize the detection of error conditions in DNS services (e.g., provided by DNS server 240) as a trigger to troubleshoot connectivity problems. A connection failure between DNS server 240 and home router 220 may cause DNS failures or timeouts 410 at home router 220. DNS timeouts 410 may be indicative of a connectivity problem (e.g., a WAN failure), and may cause home router 220 to trigger 420 a self troubleshooting mechanism 430. In one example, home router 220 may trigger 420 self troubleshooting mechanism 430 when a particular number (e.g., three, four, etc.) of DNS timeouts 410 occur between home router 220 and the primary DNS server, and another particular number (e.g., three, four, etc.) of DNS timeouts 410 occur between router 220 and the secondary DNS server.

As further shown in FIG. 7A, process 700 may include determining whether a mechanism timer has expired (block 710). If the mechanism timer has not expired (block 710-NO), process 700 may include doing nothing (block 715). If the mechanism timer has expired (block 710—YES), process 700 may include determining whether a reboot timer has expired (block 720). For example, in an implementation described above in connection with FIG. 4, home router 220 may include a mechanism timer that must expire before self troubleshooting mechanism 430 may execute again. The mechanism timer may be configured by service provider 260, and may include a particular number of hours (e.g., six, twelve, twenty-four, etc. hours) that must expire before self troubleshooting mechanism 430 may execute again. Home router 220 may include a reboot timer that must expire before self troubleshooting mechanism 430 may cause home router 220 to reboot again. The reboot timer may be configured by service provider 260, and may include a particular number of hours (e.g., twelve, twenty-four, etc. hours) that must expire before self troubleshooting mechanism 430 may cause home router 220 to reboot again. If the mechanism timer has not expired, home router 220 may do nothing and may not execute self troubleshooting mechanism 430. After expiration of the mechanism timer, self troubleshooting mechanism 430 may cause home router 220 to perform a variety of operations 440 in order to resolve the connectivity problem.

Returning to FIG. 7A, if the reboot timer has not expired (block 720—NO), process 700 may include doing nothing (block 715). If the reboot timer has expired (block 720—YES), process 700 may include rebooting the device and collecting error logs associated with the device (block 725). For example, in an implementation described above in connection with FIG. 4, if either the reboot timer has not expired, home router 220 may do nothing and may not execute self troubleshooting mechanism 430. After expiration of the reboot timer, self troubleshooting mechanism 430 may cause home router 220 to reboot and collect troubleshooting error logs associated with home router 220 and/or the connectivity problem.

As further shown in FIG. 7A, process 700 may include determining whether a connectivity problem is resolved (block 730). If the connectivity problem is resolved (block 730—YES), process 700 may include sending the error logs to a log server (block 735). For example, in an implementation described above in connection with FIG. 4, if rebooting corrects the connectivity problem and/or no further DNS timeouts 410 occur, home router 220 may determine that the connectivity problem is resolved, as indicated by reference number 450. Home router 220 may provide troubleshooting error logs 460 to log server 250. Troubleshooting error logs 460 may include one or more error codes generated by home router 220 when home router 220 experiences connectivity problems with user devices 230, network 270, etc.

As further shown in FIGS. 7A and 7B, if the connectivity problem is not resolved (block 730—NO), process 700 may include requesting a decision to continue troubleshooting and to perform a device reset (block 740), and receiving, based on the request, an indication to continue troubleshooting and to perform the device reset (block 745). For example, in an implementation described above in connection with FIG. 4, if rebooting does not correct the connectivity problem, self troubleshooting mechanism 430 may cause home router 220 to provide for display (e.g., to a user via one or more user devices 230) information requesting whether or not the user wishes to continue to troubleshoot the connectivity problem. If the user wishes to continue to troubleshoot the connectivity problem, the user may provide a second indication (e.g., via one or more user devices 230) indicating that the user wishes to continue to troubleshoot the connectivity problem. Based on the second indication, self troubleshooting mechanism 430 may cause home router 220 to provide for display (e.g., via one or more user devices 230) information requesting whether or not the user wishes to perform a factory reset of home router 220. If the user wishes to perform a factory reset of home router 220, the user may provide a fourth indication (e.g., via one or more user devices 230) indicating that the user wishes to perform a factory reset of home router 220. Based on the fourth indication, self troubleshooting mechanism 430 may cause home router 220 to perform a factory reset.

As further shown in FIG. 7B, process 700 may include determining whether the connectivity problem is resolved (block 750). If the connectivity problem is resolved (block 750—YES), process 700 may include sending the error logs to the log server (block 755). If the connectivity problem is not resolved (block 750—NO), process 700 may include providing an error code and a customer service number (block 760). For example, in an implementation described above in connection with FIG. 4, if factory reset corrects the connectivity problem and/or no further DNS timeouts 410 occur, home router 220 may determine that the connectivity problem is resolved, as indicated by reference number 450. Home router 220 may provide troubleshooting error logs 460 to log server 250. If the factory reset does not correct the connectivity problem, self troubleshooting mechanism 430 may cause home router 220 to provide for display, to the user, an error code associated with the connectivity problem, a customer service center telephone number, and instructions to call the customer service center.

Returning to FIG. 7B, process 700 may include receiving, based on the request, an indication not to continue troubleshooting and not to perform the device reset (block 765), and providing an error code and a customer service number (block 760). For example, in an implementation described above in connection with FIG. 4, if the user does not wish to continue to troubleshoot the connectivity problem, the user may provide a first indication (e.g., via one of more user devices 230) indicating that the user does not wish to continue to troubleshoot the connectivity problem. Based on the first indication, self troubleshooting mechanism 430 may cause home router 220 to provide for display, to the user, an error code associated with the connectivity problem, a customer service center telephone number, and instructions to call the customer service center. If the user does not wish to perform a factory reset of home router 220, the user may provide a third indication (e.g., via one of more user devices 230) indicating that the user does not wish to perform a factory reset of home router 220. Based on the third indication, self troubleshooting mechanism 430 may cause home router 220 to provide for display, to the user, an error code associated with the connectivity problem, a customer service center telephone number, and instructions to call the customer service center.

Systems and/or methods described herein may provide a home router that proactively monitors and troubleshoots connectivity problems associated with service provider networks (e.g., WANs) and/or user devices of a customer premises network (e.g., a LAN). The home router may begin to troubleshoot the connectivity problems based on detection of one or more trigger conditions. The trigger conditions may be detectable by the home router using relatively litter computing resources of the home router, which may help to prevent performance degradation of the home router. The proactive monitoring and troubleshooting by the home router may prevent customers from utilizing customer service centers (e.g., provided by the service provider) when the connectivity problems arise. This may reduce customer call volume to the customer service centers and may provide better customer end-to-end service.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7A and 7B, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the articles "a" and "an" are intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:

detecting, by a device, one or more domain name system (DNS) timeout errors indicative of a connectivity problem to trigger a troubleshooting mechanism;

determining, by the device and based on detection of the one or more DNS timeout errors, whether a mechanism timer has expired prior to troubleshooting the connectivity problem, troubleshooting the connectivity problem not being permitted until the mechanism timer has expired;

determining, by the device and based on detection of the one or more DNS timeout errors, whether a reboot timer has expired prior to troubleshooting the connectivity problem, the reboot timer indicating a time period, since a previous reboot, that must expire before rebooting is permitted to troubleshoot the connectivity problem, the reboot timer being remotely configured by a service provider via a remote control protocol, the remote control protocol including at least one of a Technical Report (TR-069) protocol or a Simple Network Management Protocol (SNMP);

rebooting the device and collecting error logs, associated with the connectivity problem, based on the mechanism timer and the reboot timer having expired;

determining, by the device, whether the rebooting of the device has corrected the connectivity problem;

sending, by the device, the error logs to a log server associated with the service provider when the rebooting of the device corrects the connectivity problem;

providing, by the device, a request to perform a reset of the device to default settings when the rebooting of the device fails to correct the connectivity problem, the reset of the device to the default settings being a different operation than the rebooting of the device;

receiving, by the device and based on the request, an instruction to perform the reset of the device;

resetting the device to the default settings based on the instruction;

determining, by the device, whether the resetting of the device has corrected the connectivity problem; and sending, by the device, the error logs to the log server when the resetting of the device corrects the connectivity problem.

2. The method of claim 1, where the mechanism timer indicates another time period, since a previous troubleshooting, that must expire before troubleshooting the connectivity problem is permitted.

3. The method of claim 1, further comprising:

preventing troubleshooting of the connectivity problem when either the mechanism timer or the reboot timer has failed to expire.

4. The method of claim 1, further comprising:

providing a customer service number and an error code, associated with the connectivity problem, when the resetting of the device fails to correct the connectivity problem.

5. The method of claim 1, further comprising:

receiving, based on the request, a different instruction, than the instruction to perform the reset of the device, where the different instruction instructs the device to not perform the resetting of the device; and providing, based on the different instruction, a customer service number and an error code, associated with the connectivity problem.

6. The method of claim 1, where the device includes a home router provided in a customer premises network.

7. The method of claim 6, where:
the request to perform the reset of the device is provided to a user device connected to the home router, and
the instruction is received from the user device.

8. A device, comprising:
a communication interface; and
a processor to:
detect one or more domain name system (DNS) timeout errors indicative of a connectivity problem to trigger a troubleshooting mechanism,
determine, based on detection of the one or more DNS timeout errors, whether a mechanism timer has expired prior to troubleshooting the connectivity problem,
troubleshooting the connectivity problem not being permitted until the mechanism timer has expired,
determine, based on detection of the one or more DNS timeout errors, whether a reboot timer has expired prior to troubleshooting the connectivity problem,
the reboot timer indicating a time period, since a previous reboot, that must expire before rebooting is permitted to troubleshoot the connectivity problem,
the reboot timer being remotely configured by a service provider via a remote control protocol,
the remote control protocol including at least one of a Technical Report (TR-069) protocol or a Simple Network Management Protocol (SNMP),
reboot the device and collect error logs, associated with the connectivity problem, based on the mechanism timer and the reboot timer having expired,
determine whether the rebooting of the device has corrected the connectivity problem,
send, via the communication interface, the error logs to a log server associated with the service provider when the rebooting of the device corrects the connectivity problem,
provide, via the communication interface, a request to perform a reset of the device to default settings when the rebooting of the device fails to correct the connectivity problem,
the reset of the device to the default settings being a different operation than the rebooting of the device,
receive, based on the request and via the communication interface, an instruction to perform the reset of the device,
reset the device to the default settings based on the instruction,
determine whether the resetting of the device has corrected the connectivity problem, and
send, via the communication interface, the error logs to the log server when the resetting of the device corrects the connectivity problem.

9. The device of claim 8, where
determine the mechanism timer indicates another time period, since a previous troubleshooting, that must expire before troubleshooting the connectivity problem is permitted.

10. The device of claim 8, where the processor is further to:
prevent troubleshooting of the connectivity problem when either the mechanism timer or the reboot timer has failed to expire.

11. The device of claim 8, where the processor is further to:
provide a customer service number and an error code, associated with the connectivity problem, when the resetting of the device fails to correct the connectivity problem.

12. The device of claim 8, where the processor is further to:
receive, based on the request, a different instruction, than the instruction to perform the reset of the device, where the different instruction instructs the device to not perform the resetting of the device, and
provide, based on the different instruction, a customer service number and an error code, associated with the connectivity problem.

13. The device of claim 8, where the device includes a home router provided in a customer premises network.

14. A non-transitory computer-readable medium, comprising:
one or more instructions that, when executed by a processor of a device, cause the processor to:
detect one or more domain name system (DNS) timeout errors indicative of a connectivity problem to trigger a troubleshooting mechanism,
determine, based on detection of the one or more DNS timeout errors, whether a mechanism timer has expired prior to troubleshooting the connectivity problem,
troubleshooting the connectivity problem not being permitted until the mechanism timer has expired,
determine, based on detection of the one or more DNS timeout errors, whether a reboot timer has expired prior to troubleshooting the connectivity problem,
the reboot timer indicating a time period, since a previous reboot, that must expire before rebooting is permitted to troubleshoot the connectivity problem,
the reboot timer being remotely configured by a service provider via a remote control protocol,
the remote control protocol including at least one of a Technical Report (TR-069) protocol or a Simple Network Management Protocol (SNMP),
reboot the device and collect error logs, associated with the connectivity problem, based on the mechanism timer and the reboot timer having expired,
determine whether the rebooting of the device has corrected the connectivity problem,
send the error logs to a log server associated with the service provider when the rebooting of the device corrects the connectivity problem,
provide a request to perform a reset of the device to default settings when the rebooting of the device fails to correct the connectivity problem,
the reset of the device to the default settings being a different operation than the rebooting of the device,
receive, based on the request, an instruction to perform the reset of the device,
reset the device to the default settings based on the instruction,
determine whether the resetting of the device has corrected the connectivity problem, and
send the error logs to the log server when the resetting of the device corrects the connectivity problem.

15. The non-transitory computer-readable medium of claim 14,
one where the mechanism timer indicates another time period, since a previous troubleshooting, that must expire before troubleshooting the connectivity problem is permitted.

16. The non-transitory computer-readable medium of claim 14, further comprising:
one or more instructions that, when executed by the processor, cause the processor to:
prevent troubleshooting of the connectivity problem when either the mechanism timer or the reboot timer has failed to expire.

17. The non-transitory computer-readable medium of claim 14, further comprising:
- one or more instructions that, when executed by the processor, cause the processor to:
- provide a customer service number and an error code, associated with the connectivity problem, when the resetting of the device fails to correct the connectivity problem.

18. The non-transitory computer-readable medium of claim 14, further comprising:
- one or more instructions that, when executed by the processor, cause the processor to:
- receive, based on the request, a different instruction, than the instruction to perform the reset of the device, where the different instruction instructs the device to not perform the resetting of the device, and
- provide, based on the different instruction, a customer service number and an error code, associated with the connectivity problem.

19. The non-transitory computer-readable medium of claim 14, where the device includes a home router provided in a customer premises network.

\* \* \* \* \*